Feb. 1, 1949.　　J. M. GAYLORD ET AL　　2,460,415
SELECTIVE MOTOR LINE CONNECTING DEVICE
Filed Nov. 16, 1944

Inventors
James M. Gaylord
Rowland E. Ball
By Lyon & Lyon Attorneys

Patented Feb. 1, 1949

2,460,415

UNITED STATES PATENT OFFICE 2,460,415

SELECTIVE MOTOR LINE CONNECTING DEVICE

James M. Gaylord, San Marino, and Rowland E. Ball, Long Beach, Calif., assignor to Byron Jackson Co., Vernon, Calif., a corporation of Delaware Application November 16, 1944, Serial No. 563,760

9 Claims. (Cl. 172—36)

1

This invention relates to selective motor line connecting devices which are particularly adapted for incorporation in submersible electric motors, more particularly in such motors which are combined with pump units, although the device may be employed on motors used for purposes other than the operation of pumps. The term "submersible" as used herein, means that type of motor which is surrounded by a fluid either liquid gas or air, and in which the fluid is excluded from access to the interior of the motor.

An object of this invention is to provide a selective motor line connecting device whereby a readily accessible plate may be attached in one or two positions and automatically alter the various connections between the windings of the motor and the supply line in order that the motor may operate on different line voltages. For example, the device may be arranged to permit operation of the motor on 220 or 440 volts.

A further object of this invention is to provide a selective motor line connecting device which is virtually foolproof particularly in regard to the internal circuits of the motor, that is, all of the connections necessary to permit operation on 220 volts or 440 volts are automatically made when the device is set in one position or the other.

With the above and other objects in view as may appear hereinafter, reference is directed to the accompanying drawings in which.

Figure 1:
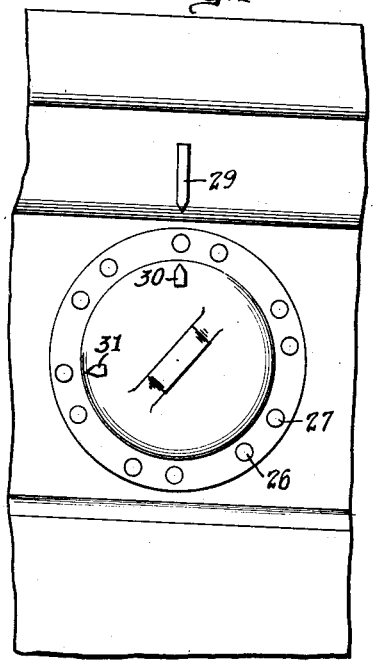
Fig. 1 is a fragmentary elevational view of the submersible motor showing our device in position thereon.
Figure 2:
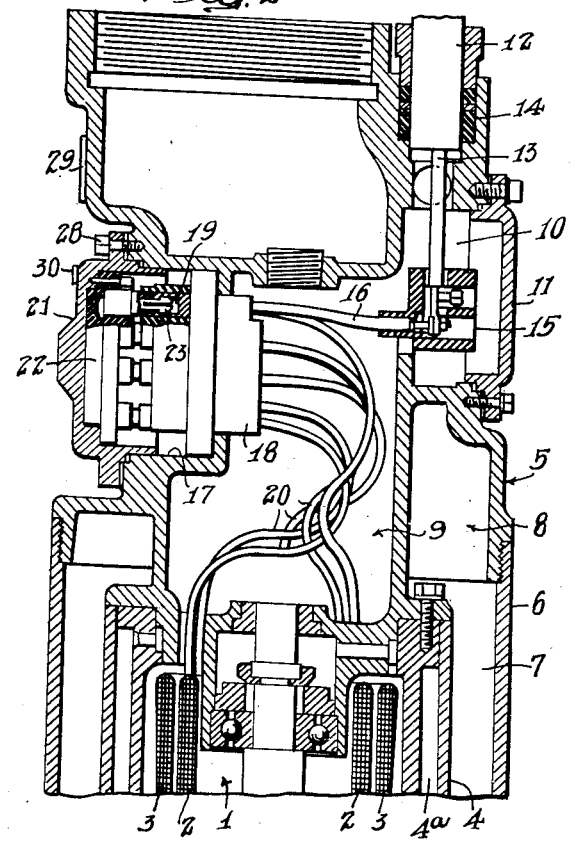
Fig. 2 is a fragmentary longitudinal sectional view of a motor and our device, portions being shown in elevation.
Figure 3:
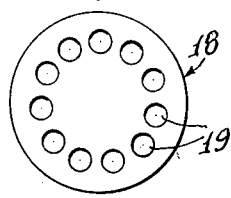
Figs. 3 and 4 are elevational views, respectively, of the terminal block and its terminal sockets, and the terminal plate and its terminal prongs which form the mating elements of our device.
Figure 4:
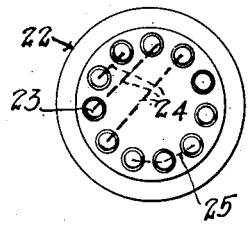

With reference to the drawings, an electric motor 1 employed in a manner more fully disclosed in a copending application of Carl J. Blom, Serial No. 547,617, filed August 1, 1944, now patent 2,404,783, issued July 30, 1946, is provided. The motor 1 is preferably a three-phase motor and provided with sets of windings 2 and 3 adapted to be connected in parallel for 220 volt operation and in series for 440 volt operation. The motor is contained in a suitable housing 4

2 which, in the present instance, forms a complete enclosure for the motor and provides passageways 4a for circulation of a dielectric and lubricating fluid in and around the motor. The upper end of the motor receives a motor head 5. The motor head also functions as an adapter which is screw-threaded to a shell 6 encasing the motor housing 4 and forming therewith a passage 7 for the flow of fluid delivered from a pump (not shown) but which is operated by the motor 1. The motor head 5 defines a passageway 8 which continues from the passageway 7 and is adapted to be connected to a discharge line (not shown). Within the motor head structure and isolated from the passage 8 is a main junction compartment 9. The junction compartment is in fluid communication with the interior of the motor 1 and is filled with a dielectric and lubricating fluid.

In one wall of the motor head 5 is formed a line junction compartment 10 which is in communication with the compartment 9 and is provided with a cover plate 11. An electric cable 12 containing line conductors 13, extends through a stuffing-box 14 into the line junction compartment 10. A terminal block 15 is provided in the compartment 10 which receives the line conductors 13 and joins the line conductors 13 to line leads 16.

A side wall of the motor head preferably opposite from the compartment 10, is provided with a recess 17 opening into the main junction compartment 9. Seated within the recess is a terminal base 18 of insulating material which carries a plurality of terminal socket members 19 preferably arranged in a circle. In the construction illustrated, eleven of such terminal socket members are provided, two of which, however, are blank.

The arrangement herein illustrated is adapted for three-phase motors; consequently, there are three line leads 16. These connect to three of the socket members 19. In addition, these three sockets are connected to three of the motor winding leads 20, the remaining motor winding leads being connected to the remaining terminal sockets. The motor winding leads are connected to the motor windings 2 and 3 in a manner to be described hereinafter.

The recess 17 is closed by a cover plate 21 which supports a terminal plate 22 of insulation material. Set in the terminal plate are terminal prongs 23 arranged in a circle. In the construction illustrated, nine of such prongs are provided. Three pairs of the terminal prongs 23 are joined by bridging leads 24, whereas the remaining three terminal prongs are joined by a shorting bar 25. The cover plate 21 is adapted to occupy one of two positions and for this purpose is provided with two sets of bolt openings 26 and 27, either set adapted to receive bolts 28. A reference marker 29 is provided on the exterior of the motor head 5, and a pair of reference pointers 30 and 31 are provided on the cover plate 21 so that one or the other of the pointers register with the reference marker when the cover plate is secured in one or the other of its two positions.

The electrical arrangement provided by the various terminal members which form the operating elements of our line connecting device, is best explained by reference to Fig. 5 wherein the various leads and their corresponding terminals are designated by capital letters. Thus the line conductors designated A, B, C are joined to sockets A, B, C and to the one extremities of the three coils which comprise the set of windings 2. These extremities likewise are designated A, B, C. Terminal sockets designated D, E, F are joined, respectively, to the remaining extremities of the set of motor windings 2. Between the sets of sockets A, B, C and D, E, F are located the pair of black sockets and the three remaining active sockets designated H, I, J. The sockets H, I, J are connected to the extremities likewise designated H, I, J of the second set of windings 3. The remaining ends of these windings, however, are joined together.

Figure 5:
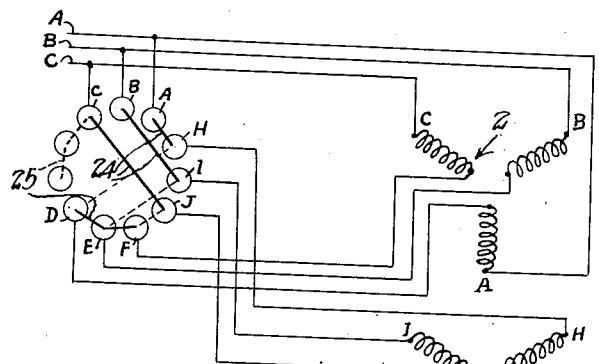
Fig. 5 is a wiring diagram showing the manner in which our device provides the necessary connections between a power line and the windings of a three-phase motor.

The terminal prongs and their bridging leads are so arranged that for one position of the cover plate 21 the terminal prongs join sockets A, B, C with sockets H, I, J as indicated by solid lines in Fig. 5. In this position the shorting bar and its respective terminal prongs short the connections between sockets D, E, F. When the cover plate is so positioned the two sets of windings 2 and 3 are connected in parallel with the power supply leads A, B, C and the motor operates on a lower voltage, usually 220 volts.

When the cover plate 21 is set in its other position, sockets D, E, F are connected to sockets H, I, J so that the two sets of windings 2 and 3 are in series. In this position the shorting bar is inoperative as two of its corresponding terminal prongs fit in the blind or inoperative terminal sockets, and although one of the prongs may fit in socket C, the lead is still open as are also the leads which join to sockets A and B.

By reason of the fact that the cover plate can occupy only two different positions, and when in these positions all of the connections between the motor windings and the supply line are completed correctly, it is virtually impossible to improperly connect the windings of the motor with the power supply line.

Many other embodiments of the invention may be resorted to without departing from the spirit of the invention.

We claim:

1. In a device for effecting predetermined connections between an electric motor and power line wherein the motor is provided with sets of windings adapted for series or parallel connection, the combination of: a terminal base mounted in proximity to said motor; a co-planular ring of terminal elements carried by said base including a set of terminal elements for each set of windings, and for said power line; and a terminal plate; means for selectively securing said terminal plate in different positions offset with respect to each other and to said terminal base in the plane of the confront faces of said terminal plate and terminal base; and electrically connected groups of mating terminal devices carried by said terminal plate for selective connection with said sets of terminal elements to effect a series connection between said windings and power line or parallel connections therebetween depending on the position occupied by said terminal plate.

2. In a device for effecting predetermined connections between an electric motor and power line wherein the motor is provided with sets of windings adapted for series or parallel connection, the combination of: a terminal base mounted in proximity to said motor; a coacting terminal plate; means for selectively securing said terminal plate in different positions offset with respect to each other and to said terminal base in the plane of the confronting faces of said terminal plate and terminal base; terminal elements carried by said terminal base including a first set connected to said power line and to the one extremities of one set of windings; a second set connected to the remaining extremities of said one set of windings; and a third set connected to the one extremities of the other set of windings, said other set of windings being joined together at their remaining extremities; terminal members carried by said terminal plate, several of said terminal members being connected in pairs, to join said first and third or said second and third sets of terminal elements depending on the position selected for said terminal plate; and a shorting bar positioned to join together the remaining extremities of said one set of windings when said first and third sets of terminal elements are joined.

3. A device for effecting predetermined connections between an electric motor and power line wherein the motor is provided with sets of windings adapted for series or parallel connections, the combination of: a terminal base; a ring of terminal elements secured therein and arranged in sets connected with corresponding sets of motor winding leads, one of said sets also being connected to said power lines; a terminal plate; means for securing said terminal plate in at least one of two planularly offset positions relatively to said terminal base; a ring of terminal members carried by said terminal plate and several of said terminal members being arranged in electrically connected pairs to cause said pairs of terminal members to selectively bridge between different sets of terminal elements depending upon the position of said terminal plate, others of said terminal members being shorted so as to provide a shorting connection between the members of one set of terminal elements when said terminal plate occupies one of its positions, said shorting connection being inoperative when said terminal plate occupies its other position.

4. In a device for effecting predetermined connections between an electric motor and power line wherein the motor is provided with sets of windings adapted for series or parallel connection, the combination of: a terminal base of disk form mounted in proximity to said motor; a terminal plate positioned over said terminal base; coacting terminal elements and terminal devices arranged in ring formation on the confronting sides of said terminal base and terminal plate respectively; means for selectively mounting said terminal plate on said terminal base in at least two pre-selected co-planular positions whereby correspondingly different groups of said terminal elements and terminal devices are caused to engage, the terminal elements of said terminal base being divided into a set connected with said power supply and a set connected with each set of windings; and bridging means between the selected terminal devices of said terminal plate for effecting series or parallel connection between said sets of windings depending upon the position of said terminal plate.

5. In a device for effecting predetermined connections between an electric motor and power line wherein the motor is provided with sets of windings adapted for series or parallel connection, the combination of: a terminal base; a terminal plate said base and plate being of disk form; means for securing said plate in at least one of two predetermined co-planular positions on said base; a plurality of terminal elements carried by said base and by said plate, there being blind terminal positions in excess of the terminals required to effect electrical connection of the motor to the power supply line, the elements of said terminal plate including a set connected to the power supply line and a set corresponding to each set of windings, and bridging means connecting selected elements of said terminal plate to effect series or parallel connection of said motor windings depending on the position of said terminal plate relative to said terminal base, at least one of said bridging means overlying said blind terminals when said motor windings are series connected.

6. A device for effecting predetermined connections between a three-phase power supply and a three-phase electric motor having dual sets of windings wherein leads from the power supply are joined to the windings in one of said sets and the windings of the other of said sets are joined together, and the remaining leads from said windings are adapted to be variously connected to dispose the sets of windings in series or parallel relation, the combination of: a terminal base; a terminal plate said base and plate presenting flat confronting sides of disk form; a plurality of terminal elements arranged in ring formation and carried by the confronting sides of said base and plate, a set of terminal elements of said terminal base being joined to said power supply and other sets joined to the remaining free extremities of said windings, certain of the terminal elements of said terminal plate joined together and positioned to effect series or parallel connection between said sets of windings and said power line depending upon which of two preselected positions said terminal plate is placed on said terminal base; and means for securing said plate to said terminal base in either of said preselected positions.

7. In a device for changing the voltage requirements of a three-phase electric motor wherein the leads from a power supply and dual windings of the motor are variously joined to effect series or parallel connection, the combination of: a terminal base; a terminal plate, said base and plate presenting confronting sides of disk form, said terminal plate being planularly shiftable to at least two positions relative to said base; coacting terminal elements in ring formation at the confronting sides of said base and plate, leads from said power supply and said windings being joined to the elements of said base; and bridging connections between certain terminal elements of said plate to effect series or parallel connection between said windings and said power supply depending on the position of said terminal plate.

8. In a device for changing the voltage requirements of a three-phase electric motor wherein the leads from a power supply and dual windings of the motor are variously joined to effect series or parallel connection, the combination of: a terminal base; a terminal plate, said terminal plate being planularly shiftable to at least two positions relative to said base; coacting terminal elements at the confronting sides of said base and plate, leads from said power supply and said windings being joined to the elements of said base; bridging connections between certain terminal elements of said plate to effect series or parallel connection between said windings and said power supply depending on the position of said terminal plate; means forming a receptacle for said terminal base; a cover member for said receptacle and adapted to support said terminal plate; means for sealingly securing said cover member to said receptacle in either of the predetermined positions of said terminal plate; and means for distinguishably indicating the position in which said cover member is placed.

9. In a device for effecting predetermined connections between an electric motor and power line wherein the motor is provided with sets of windings adapted for series or parallel connection, the combination of: a terminal base mounted in proximity to said motor; a terminal plate positioned over said terminal base; coacting terminal elements and terminal devices on the confronting sides of said terminal base and terminal plate respectively; means for selectively mounting said terminal plate on said terminal base in at least two pre-selected co-planular positions whereby correspondingly different groups of said terminal elements and terminal devices are caused to engage, the terminal elements of said terminal base being divided into a set connected with said power supply and a set connected with each set of windings; bridging means between the selected terminal devices of said terminal plate for effecting series or parallel connection between said sets of windings depending upon the position of said terminal plate; a receptacle-forming means for said terminal base; said terminal plate mounting means including a cover for sealing said receptacle and adapted to occupy at least two positions thereover and registering elements for indicating externally the position in which said cover is placed.

JAMES M. GAYLORD.
ROWLAND E. BALL.

REFERENCES CITED

The following references are of record in the file of this patent:

UNITED STATES PATENTS

| Number | Name | Date |
|---|---|---|
| 1,951,877 | Leland | Mar. 20, 1934 |
| 2,228,665 | Knopp | Jan. 14, 1941 |
| 2,321,999 | Dalton | June 15, 1943 |

Certificate of Correction

Patent No. 2,460,415                                                        February 1, 1949.

JAMES M. GAYLORD ET AL.

It is hereby certified that errors appear in the printed specification of the above numbered patent requiring correction as follows:

Column 3, line 27, for the word "black" read *blank*; column 4, line 1, claim 1, for "confront" read *confronting*; line 46, claim 3, for "lines" read *line*;

and that the said Letters Patent should be read with these corrections therein that the same may conform to the record of the case in the Patent Office.

Signed and sealed this 7th day of June, A. D. 1949.

[SEAL]

THOMAS F. MURPHY,
                                                              *Assistant Commissioner of Patents.*